United States Patent
Nagata et al.

(10) Patent No.: US 6,306,520 B1
(45) Date of Patent: Oct. 23, 2001

(54) LAMINATED FILM OR SHEET PROCESS FOR PRODUCING SAME AND LAMINATED STRUCTURE FORMED USING SAME

(75) Inventors: Makoto Nagata, Ichihara; Hiroaki Takahata, Toyonaka, both of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/217,998

(22) Filed: Dec. 22, 1998

(30) Foreign Application Priority Data

Dec. 25, 1997 (JP) .................................................. 9-357880
May 11, 1998 (JP) ................................................ 10-127292

(51) Int. Cl.$^7$ ...................................................... B32B 27/08
(52) U.S. Cl. .......................... 428/520; 428/332; 428/334; 428/335; 428/523; 525/222; 525/227; 525/231
(58) Field of Search ..................................... 428/520, 523, 428/332, 334, 335, 319.7, 319.9; 525/222, 221, 227, 231

(56) References Cited

U.S. PATENT DOCUMENTS

| | | | | |
|---|---|---|---|---|
| 3,808,180 | * | 4/1974 | Owens | 525/291 |
| 4,210,579 | * | 7/1980 | Grigo et al. | 525/88 |
| 4,965,321 | * | 10/1990 | Yuyama et al. | 525/329.7 |
| 5,236,911 | * | 8/1993 | Koyama et al. | 525/71 |
| 5,725,712 | * | 3/1998 | Spain et al. | 156/230 |
| 5,829,804 | * | 11/1998 | Sacki et al. | 293/120 |

FOREIGN PATENT DOCUMENTS

| | | |
|---|---|---|
| A2285071 | 10/1988 | (EP) . |
| 644032A2 | 3/1995 | (EP) . |
| 763560A1 | 3/1997 | (EP) . |
| 51-97658 | 8/1976 | (JP) . |
| A2 266109 | 5/1988 | (JP) . |
| A3-150156 | 6/1991 | (JP) . |
| A4-133709 | 5/1992 | (JP) . |
| A4-135716 | 5/1992 | (JP) . |
| A4-268313 | 9/1992 | (JP) . |
| 7268036 A | 10/1995 | (JP) . |
| 8025603 A | 1/1996 | (JP) . |
| A8-267500 | 10/1996 | (JP) . |
| A8-267688 | 10/1996 | (JP) . |
| A8-267692 | 10/1996 | (JP) . |
| A8-276544 | 10/1996 | (JP) . |
| A9-141788 | 6/1997 | (JP) . |
| A9-141789 | 6/1997 | (JP) . |
| A9-141790 | 6/1997 | (JP) . |
| A9-150487 | 6/1997 | (JP) . |
| A9-193189 | 7/1997 | (JP) . |
| A9-193237 | 7/1997 | (JP) . |
| A9-234836 | 9/1997 | (JP) . |
| A10-156873 | 6/1998 | (JP) . |

* cited by examiner

Primary Examiner—Blaine Copenheaver
Assistant Examiner—Christopher Paulraj
(74) Attorney, Agent, or Firm—Birch, Stewart, Kolasch & Birch, LLP

(57) ABSTRACT

There are provided;

Figure 1:
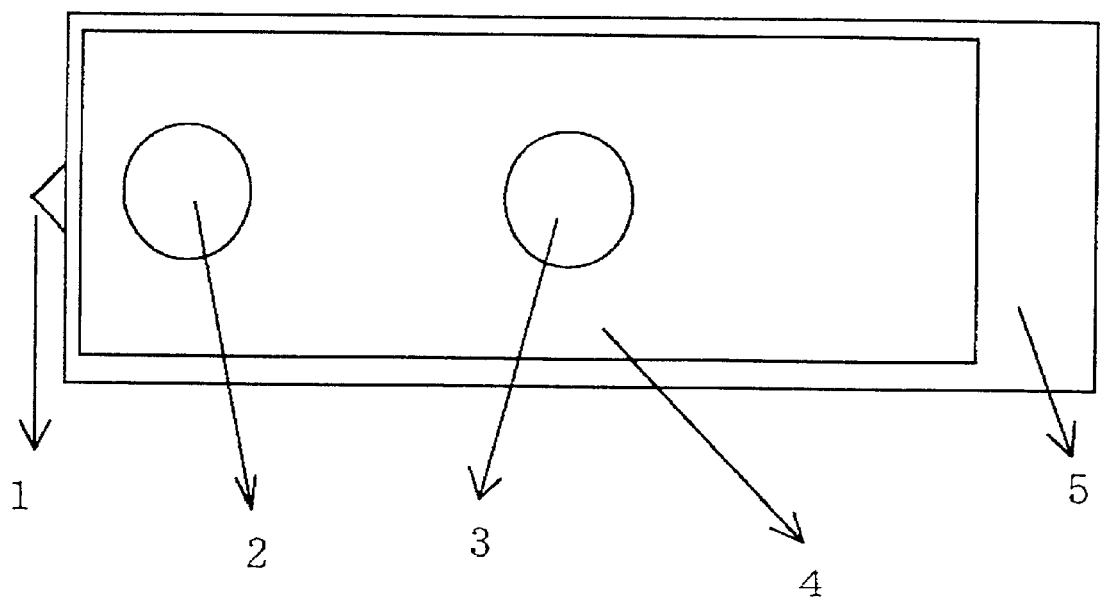

a laminated film or sheet formed by adhesively integrating a resin layer (1) of an acrylic resin with a resin composition layer (2) of a polyolefin resin composition, the polyolefin resin composition comprising an ethylene based copolymer (a) prepared by polymerizing ethylene with at least one compound selected from the group consisting of unsaturated carboxylic acids, unsaturated carboxylic esters, unsaturated carboxylic anhydrides and vinyl acetate, a polyethylene resin (b) excluding the copolymer (a), and a polypropylene resin (c), which is characterized in that the layers (1) and (2) are adhesively integrated with each other to the satisfaction, even if no layer of an adhesive agent is interposed between them;

and a laminated structure formed by adhesively integrating the laminated film or sheet with a substrate of a polyolefin resin, which is particularly suitable for uses such as interior or exterior car parts, electric appliances, parts of miscellaneous goods and signboards.

14 Claims, 1 Drawing Sheet

LAMINATED FILM OR SHEET PROCESS FOR PRODUCING SAME AND LAMINATED STRUCTURE FORMED USING SAME

The present invention relates to a laminated film or sheet formed by adhesively integrating a resin layer of an acrylic resin with a resin composition layer of a resin composition which comprises a specific ethylene based copolymer, a polyethylene resin and a polypropylene resin, a process for producing the laminated film or sheet, and a laminated structure formed by adhesively integrating the laminated film or sheet with a substrate of a polyolefin resin composition.

With respect to a creation of decoration on a surface of a polyolefin resin film or sheet, there is known a laminated film or sheet formed by adhesively integrating a film of an acrylic resin, to which a printing is applied, with a surface of the polyolefin resin film or sheet, for example, in Japanese Patent Kokai(JP-A-) Nos.9-193189 and 9-234836.

As known, a polyolefin resin and an acrylic resin are difficult to melt-adhere with each other. Therefore, in order to obtain a laminated film or sheet by adhesively integrating a film or sheet of the polyolefin resin with a film of the acrylic resin, it is indispensable to interpose a layer of an adhesive agent between them. In fact, the laminated film or sheet disclosed in the foregoing Japanese Kokais has a layer of an adhesive agent between them.

However, in the laminated film or sheet having the layer of the adhesive agent, there are problems such that a thickness of the product becomes unduly large and a production cost becomes too high due to the presence of the layer of the adhesive agent.

The former problem, namely, an unduly large thickness of the film or sheet leads to an additional problem. In the production process of a laminated structure using the above-mentioned film or sheet having the unduly large thickness, wherein a molten polyolefin resin is injected on the film or sheet set in an injection mold so as to adhesively integrate them with each other, a warp of the resulting laminated structure easily occurs. Incidentally, it is difficult to prevent the occurrence of the warp even by varying the molding and processing conditions for the laminated structure.

As to the laminated structure formed by adhesively integrating the laminated film or sheet having unduly large thickness with the polyolefin resin, there is caused a further problem. That is, at a temperature region wherein a ductile fracture of the polyolefin resin is to occur, not a ductile fracture, but a brittle fracture thereof occurs. This means inferiority in a low temperature impact property.

An object of the present invention is to provide a laminated film or sheet, wherein a film or sheet of a polyolefin resin and a film of an acrylic resin are adhesively integrated with each other to the satisfaction, even if no layer of an adhesive agent is interposed between them, a process for producing the same and a laminated structure formed by using the same.

The present inventors have undertaken a study to obtain a laminated film or sheet, wherein a film or sheet of a polyolefin resin and a film of an acrylic resin are adhesively integrated with each other to the satisfaction, even if no layer of an adhesive agent is interposed between them, and as a result, the inventors have found a fact that a desired film or sheet can be obtained by using a specific polyolefin resin composition as the polyolefin resin, and then attained to the present invention.

The present invention provides a laminated film or sheet formed by adhesively integrating a resin layer (1) of an acrylic resin with a resin composition layer (2) of a resin composition, the resin composition comprising 100 parts by weight of an ethylene based copolymer (a) prepared by polymerizing ethylene with at least one compound selected from the group consisting of unsaturated carboxylic acids, unsaturated carboxylic esters, unsaturated carboxylic anhydrides and vinyl acetate, 0 to 10 parts by weight of a polyethylene resin (b) based on 100 parts by weight of the ethylene based copolymer (a), providing that the polyethylene resin (b) excludes the copolymer (a), and 1 to 30 parts by weight of a polypropylene resin (c) based on 100 parts by weight of the copolymer (a).

The present invention also provides a process for producing the above-mentioned laminated film or sheet, which comprises a step of subjecting a surface of the resin layer (1) of the acrylic resin to corona discharge treatment, and a step of bringing the treated surface into contact with the resin composition layer (2) melt-extruded in the form of a film, followed by pressure-adhesion to perform a lamination.

The present invention further provides a laminated structure formed by adhesively integrating the above-mentioned laminated film or sheet with a substrate (A) of a polyolefin resin composition at a side of the resin composition layer (2).

FIG. 1 shows a plan view of the laminated structure in accordance with the present invention. In FIG. 1, reference numeral 1 denotes a gate, reference numeral 2 denotes a position for measuring an adhesion strength, reference numeral 3 denotes a position for measuring a 60° specular glossiness, reference numeral 4 denotes a laminated film and reference numeral 5 denotes a substrate.

The acrylic resin for the resin layer (1) which is one of the constituents of the laminated film or sheet in accordance with the present invention is a resin mainly comprising a polymer obtained from acrylic acid, methacrylic acid or an ester thereof. Thus, the term "acrylic resin" in the present invention is intended to mean the polymer per se and a resin composition containing the polymer.

A preferred acrylic resin is a resin comprising an acrylic resin (X) having a 6-membered ring acid anhydride unit represented by the following formula [I] in the molecule, the acrylic resin (X) being obtained by modifying a polymer obtained from acrylic acid, methacrylic acid or an ester thereof. More preferred is a resin comprising the acrylic resin (X) in an amount of 10 to 70% by weight. Examples of the (meth)acrylic ester are methyl acrylate, ethyl acrylate, methyl methacrylate, ethyl methacrylate, cyclohexyl methacrylate and benzyl methacrylate. These esters may be used singly or in a mixture of two or more.

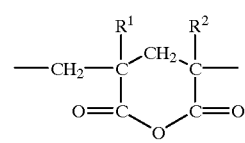

[I]

In the formula, $R^1$ and $R^2$ are the same or different and stand for a hydrogen atom or an alkyl group. When at least one of $R^1$ and $R^2$ stands for an alkyl group, methyl, ethyl, propyl, isopropyl, butyl, t-butyl, sec-butyl and amyl groups are exemplified as the alkyl group.

The acrylic resin (X) having the 6-membered acid anhydride unit [I] can be obtained by heat-treating the polymer obtained from acrylic acid, methacrylic acid or an ester thereof at a temperature of 150 to 350° C., preferably 220 to 320° C., in the presence of a base compound such as sodium hydroxide, potassium hydroxide, sodium methylate and the like, as disclosed in Japanese Patent Kokai(JP-A-) 7-268036.

A content of the 6-membered ring acid anhydride unit [I] in the acrylic resin (X) is preferably from 3 to 30% by weight, more preferably from 5 to 25% by weight. When the content is less than 3% by weight, an improvement of a thermal resistance attributed to the acrylic resin (X) may become insufficient. Whereas, when the content exceeds 30% by weight, a melt viscosity of the acrylic resin (X) may increase greatly, resulting in insufficient molding processability.

Another preferred acrylic resin is a resin composition comprising an acrylic resin composition (Y) comprising 50 to 95% by weight of an acrylic resin having a glass transition temperature of 60 to 110° C. and a weight average molecular weight of 70,000 to 600,000, and 5 to 50% by weight of an acrylic polymer of a multilayered structure comprising a layer of rubber elasticity. More preferred is a resin composition comprising 10 to 70% by weight of the acrylic resin composition (Y).

Examples of the acrylic polymer of the multilayered structure comprising the layer of rubber elasticity are an acrylic polymer of a two-layered structure having as an inner layer a layer of rubber elasticity formed from a copolymer of an alkyl acrylate with a polyfunctional monomer, the alkyl in the alkyl acrylate having 4 to 8 carbon atoms, and as an outer layer a hard polymer comprising methyl methacrylate as a main component, and an acrylic polymer of a three-layered structure having as an innermost layer a hard polymer comprising methyl methacrylate as a main component, as an intermediate layer a layer of rubber elasticity formed from a copolymer of an alkyl acrylate with a polyfunctional monomer, the alkyl in the alkyl acrylate having 4 to 8 carbon atoms, and as an outermost layer a hard polymer comprising methyl methacrylate as a main component. These acrylic polymers of a multilayered structure can be prepared by the method described in, for example, Japanese Patent Publication (JP-B-) 55-27576.

The resin layer (1) can be prepared by forming the acrylic resin into a film according to a method such as T die extrusion molding method or calendering method. From a viewpoint of a thickness precision of the resulting film, it is preferred to carry out the extrusion molding method in a manner such that both surfaces of the film are brought into contact with the surface of a roller or a metal belt. Any foreign matter even having a small particle size such as not more than 100 $\mu$m easily affects a look of the resulting film and a printability to the resulting film. In order to prevent the film from being contaminated with the foreign matter during the film formation process, it is preferred to arrange a metal- or sintering ceramic-made screen mesh in a passage of the molten acrylic resin. As the screen mesh, it is preferred to use, for example, a rotary type screen changer manufactured by Gneuss Co., Ltd. in Germany, because the meshes are hardly clogged, or even when clogged, the meshes can be recovered without a frequent discontinuation of the production process. With use of the said rotary type screen changer, there can be obtained a film substantially freed from a foreign matter having a particle size of not more than 100 $\mu$m.

A thickness of the resin layer (1) is usually from 40 to 300 $\mu$m, preferably from 80 to 250 $\mu$m. The thickness can be measured by a micrometer. When the thickness is less than 40 $\mu$m, the surface at the side of the resin layer (1) of the resulting laminated structure may be easily scratched. When the thickness exceeds 300 $\mu$m, it may become difficult to accompany the resulting laminated film or sheet accurately with a finely rugged surface of the substrate (A) to complete an adhesion, or even if the adhesion could be completed, the resulting laminated structure should show a warp or an inferior low temperature impact property.

The resin layer (1) may be a monolayer or a multilayer. As the monolayer, a resin layer of a clear acrylic resin and a resin layer of a colored acrylic resin are exemplified. As the multilayer, a resin layer of two layers formed by laminating a resin layer of a clear acrylic resin with a resin layer of a colored acrylic resin, and a resin layer of three layers formed by laminating a resin layer of a clear acrylic resin, a printing layer having a printed surface and a resin layer of a colored acrylic resin in this order are exemplified.

When the multilayer is used as the resin layer (1), the resulting laminated structure has a surface of a deep appearance. The deep appearance is due to a high clarity which is a characteristic feature of the acrylic resin, and can be observed when the colored or printed surface of the laminated structure or the surface of a lustrous particle-containing substrate (A) of the laminated structure is viewed from the decorative side thereof, namely from the side of the resin layer (1) of the laminated film or sheet constituting the laminated structure. In the case where the resin layer (1) is the multilayer and possesses both a decorated surface and a non-decorated surface, the resin composition layer (2) is laminated at a side of the non-decorated surface of the resin layer (1).

The resin composition layer (2) in accordance with the present invention is a layer formed from a resin composition comprising a specific ethylene based copolymer (a), a polyethylene resin (b), providing that the ethylene based copolymer (a) is excluded, and a polypropylene resin (c). As to a blending proportion of the components (a) (b) and (c), the ethylene based copolymer (a) is 100 parts by weight, the polyethylene resin (b) excluding the ethylene based copolymer (a) is from 0 to 10 parts by weight based on 100 parts by weight of the copolymer (a), and the polypropylene resin (c) is from 1 to 30 parts by weight based on 100 parts by weight of the copolymer (a). Preferably, the ethylene based copolymer (a) is 100 parts by weight, the polyethylene resin (b) is from 1 to 5 parts by weight, and the polypropylene resin (c) is from 3 to 20 parts by weight. More preferably, the ethylene based copolymer (a) is 100 parts by weight, the polyethylene resin (b) is from 2 to 3 parts by weight, and the polypropylene resin (c) is from 6 to 15 parts by weight.

When the blending proportion of the polyethylene resin (b) exceeds 10 parts by weight, the adhesion between the resin layer (1) and the resin composition layer (2) becomes insufficient. A blending proportion of less than 1 parts by weight of the polypropylene resin (c) results in insufficient adhesion between the resin composition layer (2) and the substrate (A), whereas a blending proportion exceeding 30 parts by weight thereof results in insufficient adhesion between the resin layer (1) and the resin composition layer (2).

The ethylene based copolymer (a) is a copolymer prepared by polymerizing ethylene with at least one compound selected from the group consisting of unsaturated carboxylic acids, unsaturated carboxylic esters, unsaturated carboxylic anhydrides and vinyl acetate.

Examples of the ethylene based copolymer (a) are ethylene-unsaturated carboxylic acid copolymers, ethylene-unsaturated carboxylic ester copolymers, ethylene-unsaturated carboxylic anhydride copolymers, ethylene-vinyl acetate copolymers, ethylene-unsaturated carboxylic ester-vinyl acetate ternary copolymers and copolymers formed by polymerizing ethylene with two or more kinds of unsaturated carboxylic esters. A content of a repeating unit derived from ethylene in the ethylene based copolymer (a) is usually from 40 to 95% by weight, and a content of a repeating unit derived from the monomer compound copolymerized with ethylene is usually from 5 to 60% by weight.

Examples of the unsaturated carboxylic acids used for the ethylene based copolymer (a), are acrylic acid and methacrylic acid, and examples of the unsaturated carboxylic esters are methyl acrylate, ethyl acrylate, 2-ethylhexyl acrylate, stearyl acrylate, glycidyl acrylate, methyl methacrylate, ethyl methacrylate, 2-ethylhexyl methacrylate, stearyl methacrylate, and glycidyl methacrylate. Maleic anhydride is exemplified as the unsaturated carboxylic anhydrides.

Preferred examples of the ethylene based copolymer (a) are ethylene-acrylic acid copolymers, ethylene-methacrylic acid copolymers, ethylene-methyl acrylate copolymers, ethylene-ethyl acrylate copolymers, ethylene-methyl methacrylate copolymers, ethylene-ethyl methacrylate copolymers, ethylene-vinyl acetate copolymers, ethylene-methyl acrylate-glycidyl methacrylate copolymers, ethylene-methyl methacrylate-glycidyl methacrylate copolymers, and ethylene-maleic anhydride copolymers. Of these, ethylene-methyl methacrylate copolymers and ethylene-vinyl acetate copolymers are more preferred. These ethylene based copolymers can be produced by a known radical polymerization method or the other known methods.

The polyethylene resin (b) includes an ethylene homopolymer, a copolymer prepared by polymerizing ethylene with at least one monomer selected from the group consisting of a olefins having 3 or more carbon atoms and other monomers, providing that the copolymer has a repeating unit derived from ethylene as a main component, and a mixture of the (co)polymers.

Examples of the polyethylene resin (b) are a low density polyethylene produced by a radical polymerization method, a high density polyethylene produced by an ionic polymerization method, and an ethylene-α-olefin copolymer produced by copolymerizing ethylene with an α-olefin according to a known radical or ionic polymerization method. Examples of the αa-olefin are those having 3 to 18 carbon atoms, such as propylene, butene-1, 4-methyl-pentene-1, hexene-1, octene-1, decene-1 and octadecene-1. The α-olefin can be used singly or in a mixture of two or more, and a content of the α-olefin is usually from 5 to 98% by weight.

The polypropylene resin (c) includes a propylene homopolymer, a copolymer prepared by polymerizing propylene with at least one monomer selected from the group consisting of ethylene, α-olefins having 4 or more carbon atoms and other monomers, providing that the copolymer has a repeating unit derived from propylene as a main component, and a mixture of these polymers.

Examples of the polypropylene resin (c) are a propylene homopolymer, a propylene-ethylene copolymer, a propylene-butene-1 copolymer, a propylene-ethylene-butene-1 terpolymer and the other propylene-α-olefin copolymers. Those exemplified above as the α-olefins copolymerized with ethylene are also exemplified as the α-olefins to be copolymerized with propylene, and the α-olefin can be used singly or in a mixture of two or more. The polypropylene resin can be produced by any known method, such as, for example, an ionic polymerization method.

The laminated film or sheet in accordance with the present invention can be produced by any known method, for example, by a known co-extrusion T die processing method, wherein the resin layer (1) and the resin composition layer (2) are co-extruded, or by a known extrusion lamination method, wherein the resin composition layer (2) melt-extruded in the form of a film is brought into contact with one side surface of the resin layer (1) prepared in advance in the form of a film, followed by a pressure adhesion, as disclosed in Japanese Patent Kokai (JP-A-) 7-314629, wherein the extrusion lamination is carried out using no anchor coating agent. In the extrusion lamination method, the surface of the resin layer (1) to be subjected to pressure-adhering to the resin composition layer (2) is preferably subjected in advance to corona discharge treatment under a corona discharge density of 75 to 150 W·min./m$^2$, and the surface of the resin composition layer (2) to be subjected to pressure-adhering to the resin layer (1) is preferably subjected in advance to ozone treatment under a condition of 5 to 50 mg/M$^2$. A temperature of the resin composition layer (2), at which the ozone treatment is carried out, is usually from 180 to 340° C., preferably from 220 to 320° C., more preferably from 250 to 300° C.

A thickness of the resin composition layer (2) is not particularly limited, and usually from 10 to 200 μm. A thickness of less than 10 μm is not preferred, because an adhesion obtained when the laminated film or sheet is adhesively integrated with the substrate (A) may be deteriorated, whereas a thickness of more than 200 μm is not preferred, because a warp deformation of the laminated structure may increase.

As mentioned above, the thickness of the resin layer (1) is usually from 40 to 300 μm, and that of the resin composition layer (2) is usually from 10 to 200 μm. Therefore, the thickness of the laminated film or sheet comprising the resin layer (1) and the resin composition layer (2) is usually from 50 to 500 μm.

The laminated structure in accordance with the present invention is formed from the laminated film or sheet and the substrate (A) of a polyolefin resin composition.

The polyolefin resin compositions used for the substrate (A) are those capable of being molded by an extrusion molding method, an injection molding method, a blow molding method and others which are known in the field of molding of thermoplastic resins, and include compositions comprising a homopolymer or copolymer of an α-olefin such as ethylene and propylene, compositions comprising a copolymer of an α-olefin with another monomer, providing that the copolymer has a repeating unit derived from the α-olefin as a main component, a mixture of the (co)polymers, and a composition comprising the (co)polymers or the mixture and a modifier such as an elastomer and filler.

Examples of the polyolefin resin compositions are polyolefin resin compositions comprising polyethylene resins (the same as the foregoing polyethylene resins (b)), polypropylene resins (the same as the foregoing polypropylene resins (c)), polybutene or poly-4-methyl-pentene-1; polyolefin resin compositions comprising copolymers prepared by copolymerizing ethylene with at least two monomers selected from the group consisting of α-olefins having 3 or more carbon atoms, and mixtures thereof with appropriate amounts of styrenic elastomers, inorganic fillers and the like.

Examples of the α-olefins having 3 or more carbon atoms are those having 3 to 20 carbon atoms such as propylene, butene-1, pentene-1, hexene-1, octene-1, decene-1, and octadecene-1.

Examples of the copolymers prepared by copolymerizing ethylene with at least two monomers selected from the group consisting of α-olefins having 3 or more carbon atoms are propylene-ethylene block copolymer, and propylene-ethylene-butene-1 block copolymer.

Among these polyolefin resin compositions, those comprising polypropylene resins such as propylene-ethylene block copolymer and the like are preferred from a viewpoint of obtaining a laminated structure having a good punching processability and a low mold shrinkage.

As the polyolefin resin composition having a low mold shrinkage, those having a coefficient of linear thermal expansion of not more than $1.0 \times 10^{-4}$ (1/° C.) measured at 20 to 100 ° C. are preferred. In order to attain the desirable low mold shrinkage, the polyolefin resin compositions may comprise 5 to 40% by weight of inorganic fillers such as talc or the like.

As occasion demands, the polyolefin resin composition may contain lustrous particles such as mica covered with aluminum or titanium oxide, and pigments used usually in the field of the resin composition. In the case where the substrate (A) of the polyolefin resin composition comprising the lustrous particles is used, the resulting laminated structure possesses a surface of a deep appearance, even if no printing is applied at the underside of the resin layer (1) (the side of non-decorated surface).

The polyolefin resin such as polyethylene resin and polypropylene resin used for the polyolefin resin composition can be produced by a known method. Polymerization catalysts used for the production of the polyolefin resin are not particularly limited. For example, solid catalysts and metallocene type homogeneous catalysts can be used.

The substrate (A) can be prepared by molding the polyolefin resin composition by a known molding method, and a shape thereof is not particularly limited. Examples of the substrate (A) are polypropylene foamed sheets as disclosed in Japanese Patent Kokai (JP-A-) 6-212007, and polyolefin resin-made hollow boards as disclosed in Japanse Patent Kokai (JP-A-) 8-25603.

As the polypropylene foamed sheet, preferred is an extrusion foamed sheet having a thickness of 1 to 20 mm and a density of 0.03 to 0.7 g/cm$^3$. An expansion ratio of the foamed sheet is usually from 1.3(inclusive) to 30(exclusive), preferably from 2(inclusive) to 15(exclusive). The density can be measured by a method for determining the density by immersion in water, and the expansion ratio can be calculated by dividing the density of the resin composition by the density of the foamed sheet.

Too high density of the foamed sheet results in decrease of the expansion ratio and fails to obtain a light weight which is a characteristic feature of a foamed product. Whereas too low density thereof leads to increase of the expansion ratio, but damages a smoothness of the sheet surface.

As the polyolefin resin-made hollow boards, preferred are those having a plurality of ribs between the two paralleled ceiling boards, and a thickness of 0.5 to 50 mm.

The laminated structure in accordance with the present invention can be produced, for example, in a manner such that the polyolefin resin composition melted and plasticized is extruded through dies or injected into a mold system consisting of a couple of a male mold and a female mold to form a substrate (A), and then the surface of the laminated film or sheet is brought into contact with at least a part of the surface of the substrate (A) to perform the desired adhesion-integration, provided that the surface of the resin composition layer (2) which is one of constituents of the laminated film or sheet is touched with the surface of the substrate (A).

Alternatively, the laminated film or sheet can be adhesively integrated with the substrate (A) by a known injection molding method. For example, it can be performed by using an injection molding machine provided with an in-moldable mold in a manner such that the laminated film or sheet is attached closely to an inner surface of a cavity of an injection molding mold provided with a forwarding means of the film or sheet, a heating means of the film or sheet and a suction means (for example, a vacuum pump), and thereafter the polyolefin resin composition is subjected to injection molding. Further, it can be performed also in a manner such that the laminated film or sheet is molded so as to be fitted for a shape of the injection mold by using a vacuum molding machine, the vacuum-molded film or sheet is then placed closely to an inner surface of a cavity of an injection mold, and thereafter the polyolefin resin composition is subjected to injection molding. These methods for the production of the laminated structure can perform simultaneously both the molding of the substrate (A) according to the injection molding method and adhesion thereof.

A glossiness of the surface of the laminated structure (the side of the decorated surface) in accordance with the present invention, in other words, a glossiness of the surface of the acrylic resin layer (1), is preferably not less than 80%, more preferably not less than 90%, the glossiness being expressed in terms of a 60° specular glossiness. A quality of the surface appearance increases with increase in the value of the 60° specular glossiness. The 60° specular glossiness can be measured by the method prescribed in JIS-K-7105.

A structure decorated in a conventional manner through a painting process has been required to have not only an improved appearance but also a high scratch resistance expressed in terms of a pencil hardness. According to the present invention, the laminated structure having a pencil hardness of B or more, 2H or more, or further 4H or more can be obtained by selecting an acrylic resin of a high scratch resistance suitably. Thus, the present laminated structure having a highly decorative surface and a high quality appearance with a high scratch resistance can gain an advantage over a conventional structure.

According to the present invention, there can be provided a laminated film or sheet which comprises the resin layer (1) and the resin composition layer (2), and which is superior in a quality of the surface appearance, transparency, glossiness and weatherability. In addition, the laminated film or sheet produced is superior in adhesion strength, even if no layer of an adhesive agent is interposed between the resin layer (1) and the resin composition layer (2). Further, there can be provided a laminated structure comprising both the substrate of the polyolefin resin composition superior in molding processability, recycling property, punching processability, thermal resistance and cold resistance, and the laminated film or sheet superior in a quality of the surface appearance, transparency, glossiness and weatherability, wherein the substrate and the laminated film or sheet are adhesively integrated with each other. The laminated structure in accordance with the present invention can preserve the mechanical properties attributed to the substrate of the polyolefin resin composition, because of no adhesive layer.

The laminated structure in accordance with the present invention is particularly suitable for uses such as interior or exterior car parts, electric appliances, parts of miscellaneous goods, signboards and the like. When the present laminated structure is used for the interior or exterior car parts or the electric appliances, these parts can be provided at low costs, because no painting process is required to create decoration. Further, when used for the signboards, the present laminated structure can be subjected to punching with an arbitrarily curved line, because it is produced by using the polyolefin resin composition having a high toughness as the substrate.

The present invention is illustrated in more detail with reference to the following Examples, which are only illustrative, and are not limitative for the scope of the present invention.

The injection molding machine, the mold, the shape of the molded product and the evaluation method used in Examples were as follows.

1. Injection Molding Machine and Mold

Injection molding machine FS160S25ASEN manufactured by Nissei Plastic Industrial Co., Ltd.

Molding temperature: 225° C.

Mold: 150 mm×300 mm×3 mm(thickness), fan gate

Mold temperature: 52° C. (cavity side, namely side of inserting the film), 55° C.(core side)

2. Melt Flow Rate

The polyethylene resin and the ethylene based copolymer were measured according to the method prescribed in JIS-K-7210, Condition 4, and the polypropylene resin was measured by the method prescribed in JIS-K-7210, Condition 14.

3. Glossiness

60° specular glossiness of the surface of the laminated structure obtained was measured by the method prescribed in JIS-K-7105. The measurement was carried out at nearly center of the laminated structure as shown in FIG. 1.

4. Adhesion Strength

The surface of the laminated structure (the side of the resin layer (1)) was cross cut in 2 mm×2 mm square using a razor blade to form 100 squares (10 squares in longitudinal direction ×10 squares in lateral direction), and a 24 mm wide plastic adhesive tape (Cello-Tape, a trademark of Nichiban Co., Ltd. ) was pressed over the cross cut surface under the finger-pressure and then peeled off in a stroke from the one end of the tape held with fingers. The squares remaining on the surface was counted to determine the adhesion strength between the resin layer (1) and the resin composition layer (2) in terms of residual %. The measurement was conducted at the position close by the gate, as shown in FIG. 1, which position was considered to be lowest in the adhesive strength.

5. Pencil Hardness

It was carried out according to the pencil scratch test prescribed in JIS-K-5400. In evaluating, the test was started with use of a pencil of 6 B in hardness, and continued with use of those of 5 B, 4 B and others higher in hardness in order, thereby determining the pencil which first scratched the surface of the laminated structure, and the hardness of the laminated structure was expressed in terms of the hardness of the pencil which first scratched the surface of the structure.

6. Deep Appearance

The surface of the laminated structure having the film integrated was visually evaluated depending on the following sensuous criteria.

5: deep appearance similar to that of a surface of a conventional injection molded product which had been treated by a metallic painting, followed by a clear coating.

4: sufficiently deep appearance, but slightly inferior to 5.

3: certainly deep appearance.

2: deep appearance inferior to 3, not that no deep appearance was observed.

1: absolutely no deep appearance.

7. Coefficient of Linear Thermal Expansion

The coefficient of linear thermal expansion was measured by the method prescribed in JIS-K-7197. Using the foregoing mold, a flat board was injection-molded using no film to be adhesively integrated. A center portion of the flat board was cut down in a size of 10 mm×10 mm to prepare the test piece. The coefficient of linear thermal expansion was measured both in the direction of flow and in the direction vertical thereto, and an average value thereof was adopted as the asked coefficient of linear thermal expansion. These values were obtained from a difference between the length obtained at 20° C. and that obtained at 100° C., provided that the test specimen was heated from −20° C. to 120° C. at a rate of 5 ° C./min. using TMA-DT-40 manufactured by Shimadzu Co., Ltd.

8. Low Temperature Impact Property

The center portion of the laminated structure was cut down in a size of 100 mm×100 mm to prepare a test piece. The test piece was allowed to stand in a thermostat of −10° C. for 5 hours and thereafter fixed to a holder having an opening portion of 50 mm diameter set up in the thermostat. Using the high rate impact tester RIT-8000 manufactured by Rheometrics, INC., the test piece was punched out of the surface thereof (the side of the laminated sheet) with a dart of 5/8 inch tip diameter at a definite speed of 3 m/s. Then, a relationship between the load measured with a load cell set up to a dart and a dart displacement, and the broken surface of the test piece were found to determine the state of a fracture.

EXAMPLE 1

Using a single screw extruder of 65 mm diameter, an acrylic resin composition comprising 50% by weight of the following acrylic resin (i) and 50% by weight of the following acrylic resin (ii) was extruded through a T die set up at a temperature of 250° C. and passed through a cooling and polishing roll, provided that both surfaces were brought into complete contact with the surface of the roll, thereby obtaining a desired film having a thickness of 150 μm±30 μm, as the resin layer (1).

(i) An acrylic polymer (A) having an average particle size of 300 nm, and a spherical three-layered structure consisting of an innermost layer of methyl methacrylate cross linking polymer, a intermediate layer of a soft rubbery elastomer comprising butyl acrylate as a main component and an outermost layer of methyl methacrylate polymer (refer to Example 3 of Japanese Patent Publication (JP-B-)55-27576).

(ii) A methacrylic resin having 7.8% by weight of the 6-membered ring acid anhydride unit [I], prepared by the method disclosed in Example 1 of Japanese Patent Kokai (JP-A-)7-268036.

On the other hand, a pellet mixture comprising 100.00 parts by weight of a pellet of ethylene-methyl methacrylate copolymer (produced by Sumitomo Chemical Co., a trade mark: Acryft WK307, methyl methacrylate content 25% by weight, melt flow rate: 7 g/10 min.), 2.85 parts by weight of a pellet of low density polyethylene (produced by Sumitomo Chemical Co., a trade mark: Sumikathene G801, density: 0.918 g/cm$^3$, melt flow rate: 20 g/10 min.) and 11.42 parts by weight of a pellet of propylene-ethylene random copolymer (ethylene unit content: 4% by weight, melt flow rate: 28 g/10 min.) was melt-kneaded with an extruder of 65 mm diameter, and extruded through a T die at a resin temperature of 280° C. and a speed of 40 m/min. to obtain a molten film of 450 mm wide and 100 μm thick (the resin composition layer (2)). The surface of the molten film to be bonded to the resin layer (1) was successively treated with ozone by blowing an ozone-containing air through a nozzle arranged 30 mm below the die. The amount of ozone for the treatment was 31 mg/m$^2$.

Successively, the resin layer (1) was surface-treated with a corona discharge treatment apparatus arranged to an extrusion laminator in an in-line manner at a treating density of 150 W·min./m$^2$, and then the corona discharge-treated resin layer (1) and the ozone-treated resin composition layer (2) were laminated with each other to obtain a laminated sheet. The center portion of the resulting laminated sheet was found to have a thickness of 230 µm. Thereafter, the laminated sheet was aged at 40° C. for 48 hours.

As the polyolefin resin composition for the substrate (A), a complex polypropylene (PP-1) was used, which was a resin composition comprising 61 parts by weight of crystalline propylene-ethylene block copolymer (melt flow rate: 58 g/10 min., ethylene/propylene random copolymer content 12% by weight), 14 parts by weight of ethylene-butene-1 copolymer rubber (butene-1 content: 18% by weight), 14 parts by weight of ethylene-propylene copolymer rubber (propylene content 27% by weight), and 11 parts by weight of talc (D$_{50}$: 2.1 µm). The complex polypropylene and each component thereof were prepared by the methods disclosed in Example 1 and Reference Examples 1 to 4 of Japanese Patent Kokai (JP-A-)5-86256. The coefficient of linear thermal expansion of PP-1 was found to be 8.40×10$^{-5}$.

The center portion of the laminated sheet was cut down into 100 mm×250 mm. The surface of the resin layer (1) thereof was brought into close contact with a mold cavity and then fixed with a double coated adhesive tape. Thereafter, PP-1 was injection-molded on the laminated sheet to obtain a laminated structure. The results of evaluation are shown in Table 1.

EXAMPLE 2

Using a single screw extruder of 65 mm diameter, a mixture of an acrylic resin composition comprising the following acrylic resins (iii), (iv) and (v) in a proportion of 30% by weight , 50% by weight and 20% by weight, respectively, with 0.5 parts by weight of a ultraviolet absorber, ADK STAB LA-31 (high molecular weight benzotriazole type, produced by Asahi Denka Kogyo K. K.) was extruded through a T die set up at a temperature of 250° C. , and passed through a cooling and polishing roll, provided that both surfaces of the film extruded were brought into complete contact with the surface of the roll, thereby obtaining a film having a thickness of 125 µm±µm as the resin layer (1).

(iii) An acrylic resin B of 90% by weight of methyl methacrylate unit and 10% by weight of methyl acrylate unit prepared by a bulk polymerization method, which had a glass transition temperature of 95° C., and a weight average molecular weight of 120,000.

(iv) An acrylic resin C of 80% by weight of methyl methacrylate unit and 20% by weight of butyl acrylate unit, which had a glass transition temperature of 62° C., and a weight average molecular weight of 300,000.

(v) The acrylic resin A (the same as (i) in Example 1)

Thereafter, using the resin layer (1) obtained above, Example 1 was repeated to obtain a laminated sheet. The center portion of the laminated sheet was found to have a thickness of 235 µm. The laminated sheet was cut down , and then a laminated structure was obtained in the same manner as in Example 1. The results of evaluation are shown in Table 1.

COMPARATIVE EXAMPLE 1

PP-1 was injection-molded to obtain a structure in a manner similar to that of Example 1, provided that no laminated sheet was used. The results of evaluation are shown in Table 1.

TABLE 1

| Item | Unit | Example 1 | Example 2 | Comparative Example 1 |
|---|---|---|---|---|
| Glossiness | % | 93 | 87 | 26 |
| Sheet Adhesion | % | 100 | 100 | — |
| Pencil Hardness | — | 4H | 2H | <6B |
| Deep Appearance | — | 5 | 5 | 2 |
| Fracture of Low Temperature Impact | — | Ductile | Ductile | Ductile |

What is claimed is:

1. A laminated film or sheet formed by adhesively integrating:

(1) a resin layer comprising an acrylic resin with
   (2) a resin composition layer comprising a resin composition, the resin composition comprising:
      (a) 100 parts by weight of an ethylene based copolymer prepared by polymerizing ethylene with at least one compound selected from the group consisting of unsaturated carboxylic acids, unsaturated carboxylic esters, unsaturated carboxylic anhydrides and vinyl acetate,
      (b) 0 to 10 parts by weight of a polyethylene resin based on 100 parts by weight of the ethylene based copolymer (a), providing that the polyethylene resin (b) excludes the copolymer (a), and
      (c) 1 to 30 parts by weight of a polypropylene resin based on 100 parts by weight of the copolymer (a); and
   wherein the acrylic resin comprises an acrylic resin composition comprising:
      50 to 95% by weight of an acrylic resin having a glass transition temperature of from 60 to 110° C. and a weight average molecular weight of 70,000 to 600, 000 and
      5 to 50% by weight of an acrylic polymer of a multi-layered structure comprising a layer of rubber elastic.

2. A laminated film or sheet formed by adhesively integrating:

(1) a resin layer comprising an acrylic resin with
   (2) a resin composition layer comprising a resin composition, the resin composition comprising:
      (a) 100 parts by weight of an ethylene based copolymer prepared by polymerizing ethylene with at least one compound selected from the group consisting of unsaturated carboxylic acids, unsaturated carboxylic esters, unsaturated carboxylic anhydrides and vinyl acetate,
      (b) 0 to 10 parts by weight of a polyethylene resin based on 100 parts by weight of the ethylene based copolymer (a), providing that the polyethylene resin (b) excludes the copolymer (a), and
      (c) 1 to 30 parts by weight of a polypropylene resin base on 100 parts by weight of the copolymer (a); and
   wherein the acrylic resin consists essentially of an acrylic resin (X) having a 6-membered ring acid anhydride unit represented by the following formula in the molecule, the acrylic resin being obtained by modifying a polymer obtained from acrylic acid, methacrylic acid or an ester thereof, and the content of the 6-membered ring acid anhydride unit being 3 to 30% by weight, the formula being

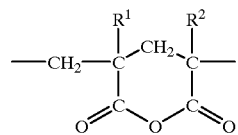

[I]

wherein R1 and R2 are the same or different, and stand for a hydrogen atom or an alkyl group.

3. The laminated film or sheet according to any one of claims 1 or 2, wherein a thickness of the resin layer (1) is from 40 to 300 μm.

4. The laminated film or sheet according to any one of claims 1 or 2, wherein the ethylene based copolymer (a) comprises an ethylene-methyl methacrylate copolymer or an ethylene-vinyl acetate copolymer.

5. The laminated film or sheet according to any one of claims 1 or 2, wherein the resin layer (1) is a monolayer comprising a colored acrylic resin, or a multilayer comprising a layer containing a colored acrylic resin and a layer containing a clear acrylic resin.

6. A process for producing a laminated film or sheet according to any one of claims 1 or 2, which comprises the steps of:

(i) subjecting a surface of the resin layer (1) comprising an acrylic resin to corona discharge treatment, (ii) placing the treated surface into contact with the resin composition layer (2) melt-extruded in the form of a film, and (iii) pressing both layers (1) and (2) to perform a lamination, wherein the surface of the resin composition layer (2) melt-extruded in the form of a film in the above-mentioned step (ii) is subjected in advance to ozone treatment.

7. A laminated structure formed by adhesively integrating the laminated film or sheet according to any one of claims 1 or 2, with a substrate comprising a polyolefin resin composition at a side of the resin composition layer (2) in the film or sheet.

8. The laminated structure according to claim 7, wherein a surface of the resin layer (1) has a 60° specular glossiness of not lower than 80%.

9. The laminated structure according to claim 7, wherein a surface of the resin layer (1) has a pencil hardness of not lower than B.

10. The laminated structure according to claim 7, wherein polyolefin resin composition comprises a polypropylene resin.

11. The laminated structure according to claim 7, wherein the polyolefin resin composition comprises a propylene-ethylene block copolymer.

12. The laminated structure according to claim 7, wherein the polyolefin resin composition has a coefficient of linear thermal expansion of not higher than $1.0\times10^{-4}$ measured at a temperature of from 20 to 100° C.

13. Interior or exterior car parts comprising the laminated structure according to claim 7.

14. The laminated structure according to claim 7, wherein the substrate is:

(i) a polyolefin resin-made hollow board having a plurality of ribs between two paralleled ceiling boards, and having a thickness of from 0.5 to 50 mm, or (ii) an extrusion foamed sheet having a thickness of 1 to 20 mm and a density of 0.03 to 0.7 g/cm³.

* * * * *